United States Patent [19]
Gozes

[11] Patent Number: 5,983,102
[45] Date of Patent: Nov. 9, 1999

[54] RADIO SYSTEM AND METHOD OF CONTROL FOR EFFICIENT SITE LOAD DISTRIBUTION

[75] Inventor: Amiram Gozes, Holov, Israel

[73] Assignee: Motorola, Inc., Schaumburg, Ill.

[21] Appl. No.: 08/875,819

[22] PCT Filed: Jan. 18, 1996

[86] PCT No.: PCT/IB96/00040

§ 371 Date: Jul. 18, 1997

§ 102(e) Date: Jul. 18, 1997

[87] PCT Pub. No.: WO96/22664

PCT Pub. Date: Jul. 25, 1996

[30] Foreign Application Priority Data

Jan. 19, 1995 [GB] United Kingdom .................... 9501007

[51] Int. Cl.⁶ .................................................... H04Q 7/20
[52] U.S. Cl. ........................................... 455/432; 455/435
[58] Field of Search ..................................... 455/432, 435, 455/436, 437, 438, 439, 442, 443, 444, 445, 446, 453

[56] References Cited

U.S. PATENT DOCUMENTS

| | | | |
|---|---|---|---|
| 4,670,899 | 6/1987 | Brody et al. ................................ | 379/60 |
| 5,212,822 | 5/1993 | Fukumine et al. ....................... | 455/435 |
| 5,241,685 | 8/1993 | Bodin et al. .............................. | 455/453 |
| 5,276,905 | 1/1994 | Hurst et al. .............................. | 455/432 |
| 5,293,641 | 3/1994 | Kallin et al. ............................. | 455/453 |
| 5,448,621 | 9/1995 | Knudsen .................................. | 455/453 |
| 5,473,667 | 12/1995 | Neustein ................................. | 455/31.2 |
| 5,574,973 | 11/1996 | Borth et al. ............................. | 455/435 |
| 5,666,356 | 9/1997 | Fleming et al. ........................ | 455/453 |
| 5,749,055 | 5/1998 | Dahlin ..................................... | 455/453 |
| 5,790,955 | 8/1994 | Tomoik ................................... | 455/453 |

*Primary Examiner*—Nguyen Vo
*Attorney, Agent, or Firm*—Andrew S. Fuller

[57] ABSTRACT

A radio system has a number of fixed transceivers (12–18) serving a number of radio coverage sites (28–34). A multi-site controller (10) has a memory (42) including mobile radio station identifications and site associations, associating mobile radio station identifications with sites. A processor (40) computes a site loading parameter for each site, dependent on the resources at the site and the number of mobile radio stations associated with the site. A request is received from a mobile radio station to form a new association between the given site and the identification of the mobile radio station sending the request and a response to the request is selected dependent on the site loading parameters in the different sites. For example in response to a first class of acknowledgment, the first site is treated as the registered site and, in response to a second class of acknowledgment, an attempt is made to register at a second site and if no acknowledgment is received from the second site, the first site is treated as the registered site.

10 Claims, 8 Drawing Sheets

RADIO SYSTEM AND METHOD OF CONTROL FOR EFFICIENT SITE LOAD DISTRIBUTION

FIELD OF THE INVENTION

This invention relates to a method of controlling a multisite radio system and it relates to such a system, for example a trunked radio system.

BACKGROUND OF THE INVENTION

In a multisite trunked radio communication system a radio can roam from site to site. The radio tries to operate at a site with the best received radio frequency (RF) level, or at a site which is specified as a preferred site for this radio (programmed to the radio on individual identity (ID) or talkgroup basis).

Normally more than one site can be received at different frequencies and the radio may select any of these sites according to a predetermined selection algorithm. The radio has to register at a site before it is allowed to operate there. Once registered the radio user may request services, such as dispatch calls, phone interconnect calls, etc., from the system.

This registration is done with a multisite controller that controls the whole trunked system. Such a multisite controller is available under the name "Smartzone Controller" from Motorola, Inc. The multisite controller maintains a database for each radio in the network. A radio (or talkgroup) may be permanently denied to operate at a site (individual or talkgroup disabled at that site). Some services may be selectively disabled for a radio for a site (e.g. interconnect calls, talkgroup calls, announcement calls, etc.).

Whenever a radio locks to a new site, it tries to register at that site by sending its individual ID and current talkgroup. The multisite controller checks if both an individual ID and a present talkgroup are disabled at that site for denying access and, if not, it grants the registration. If the registration request is denied the radio searches for another site. If the registration request is granted the radio remains operating at that site. When the user wishes to initiate any service request the radio sends its individual ID and the required service. The multisite controller checks if the requested service is enabled to that individual ID at that site. If the kind of service is allowed and there are resources available for that request (e.g. voice channels, interconnect channels, data channels, etc.) the service is granted.

In the event that the kind of service is allowed and there are no resources immediately available the user enters a busy queue, to be served when the resources become available. If the service is disabled a "service reject" code is sent. A new identical request from the radio will be handled by the multisite controller in the same way again. There may be cases in which radios will concentrate operating at some of the sites thereby overloading these site resources while other sites will be loaded only lightly. This may happen when the selected sites have strong transmission power (or their antennae are located high), or simply due to random selection which occasionally can yield uneven distribution. Once a radio operates at a site, the RF level of the adjacent sites needs to be significantly stronger to force an attempt to switch site (in order to prevent frequent site switching as the RF level is temporarily faded). This means that the duration of uneven site load condition may last a relatively long time. In the field of handover methods for cellular radiotelephones it is known to consider not only the received field strengths but also the actual traffic loading in each cell, for example in considering whether to hand over from a micro-cell to a macro-cell. These methods teach only about traffic distribution and not about registration distribution.

Previous multisite controllers have been somewhat rigid in operation, either totally accepting or rejecting registration requests and either totally accepting or rejecting requests for service (with service requests being put in a busy queue and granted later if not immediately granted). There is a need for an improved method of operation of a trunked, cellular or other radio system.

SUMMARY OF THE INVENTION

According to the present invention, a method of controlling a radio system is provided. At the radio an attempt is made to register with a first site. At the first site a site loading parameter is monitored and, if the site loading parameter does not exceed a threshold, a first class of acknowledgment is sent to the radio and if the site loading parameter exceeds the threshold, a second class of acknowledgment is sent to the radio. At the radio, in response to a first class of acknowledgment, the first site is treated as the registered site for further communications and in response to a second class of acknowledgment, an attempt is made to register at a second site and if no acknowledgment (first class or first and second class) is received from the second site, the first site is treated as the registered site.

In this manner, the radio is forced to search for another site. It is preferred that the radio remains registered at the first site upon checking whether all other sites have been tested recently and determining that none has responded with a first class acknowledgment. The arrangement allows a multisite controller to temporarily restrict site access or control the relative site loading. The multisite controller decides according to dynamic site loading conditions, rather than to a static database as has previously been the case. The arrangement is more flexible than prior arrangements and provides a mechanism for controlling the densities and distributions of registered radios as well as traffic resource usage.

The second class of acknowledgment can be referred to as a "site loaded acknowledge" (ack) outbound signaling word (OSW). A site may continue to be treated as the registered site until a first class of acknowledgment is received from another site. An attempt may be made to register at each of a finite list of adjacent sites and, if no first class acknowledgment is received from one of those other sites, the first site may continue to be treated as the registered site. Prior to sending a second class of acknowledgment, a check is preferably made as to whether an adjacent site exists on which the radio is permitted to operate and at which the site loading parameter does not exceed a threshold. Following receipt of an acknowledgment at a radio from a given site acknowledging registration in response to an attempt to register, a request for service can be sent to the site.

In response to a request for service, the preferred operation is that if a traffic resource is immediately available at the site, an unconditional traffic resource grant message is sent. If a traffic resource is not immediately available at the site a check is made whether an adjacent site exists, on which the radio is permitted to operate and at which the site loading parameter does not exceed a threshold. If no such site exists, the identification of the radio requesting service is added to a queue of identifications and if such a site exists, a message is sent denying the traffic resource.

This message can be referred to as a "busy-switch site reject" OSW. At a radio, upon receipt of a message denying a traffic resource, a service may be requested from an adjacent site. Preferably a service is requested from each of a finite list of adjacent sites and, if no message is received from one of those sites confirming grant of service, service is again requested from the first site.

In the radio system, a time-out period may be monitored between a first request for service from a given radio which results in denying of service and a second request for service from the same radio and, if the second request is received within a time-out period, the identification of the radio requesting service may be added to the queue for service.

In another aspect of the invention, a radio system is provided comprising a plurality of fixed transceivers serving a plurality of radio coverage areas and a multisite controller connected to the fixed transceivers. The multisite controller comprises: a memory including radio identifications and site associations, associating radio identifications with sites at which the corresponding radios are registered; processing means for computing a site loading parameter for each site, dependent on the resources at the site and the number of radios associated with the site; receiving means for receiving from a given site a request from a radio to form a new association between the given site and the identification of the radio sending the request; and selection means, responsive to the computation means, for selecting a response to the request dependent on the site loading parameter in the given site and the site loading parameter in at least one adjacent site.

A preferred embodiment of the invention is now described, by way of example only, with reference to the drawings.

DETAILED DESCRIPTION OF THE DRAWINGS

Figure 1:
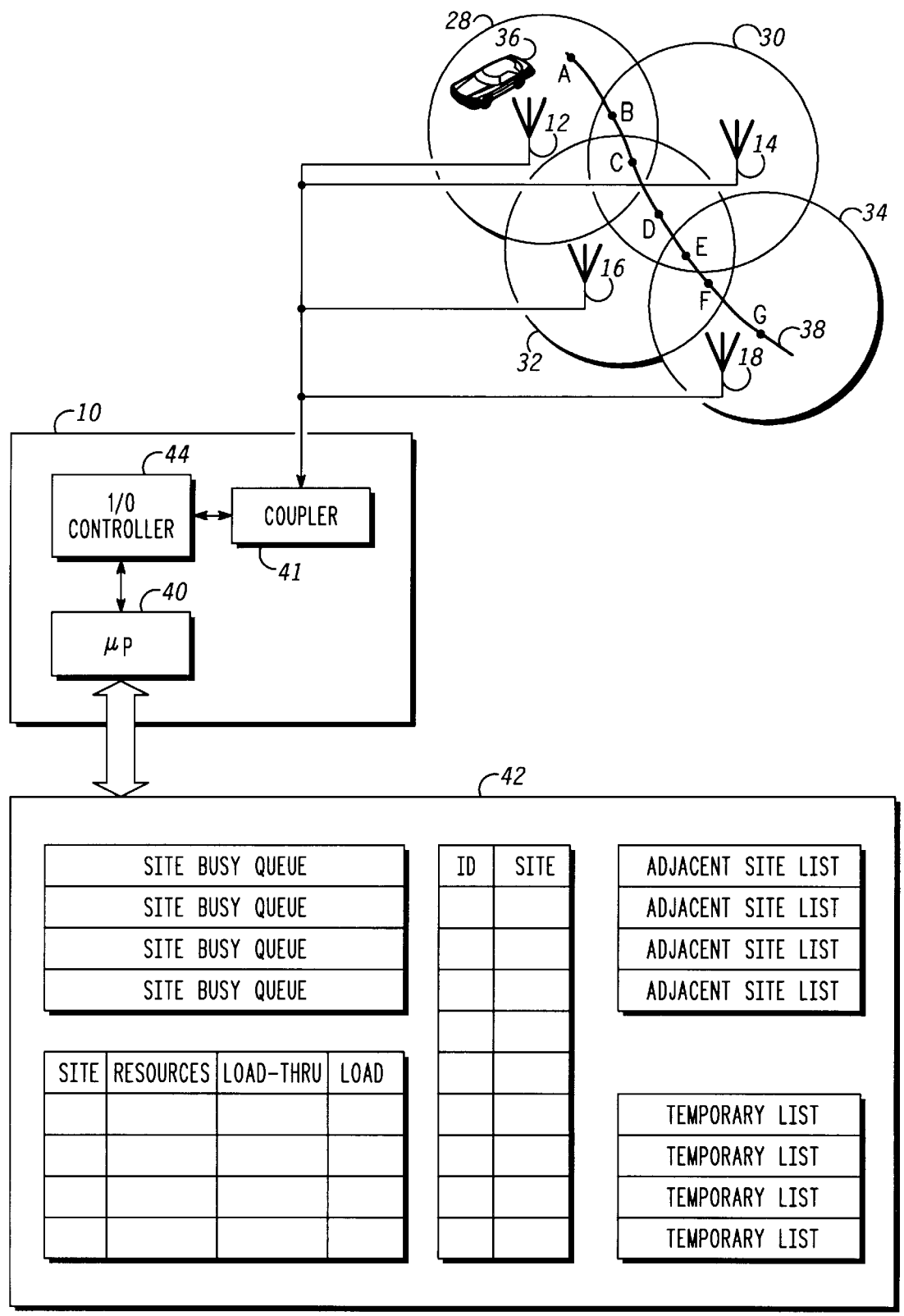
FIG. 1 shows a multisite trunked radio communication system.
Figure 2:
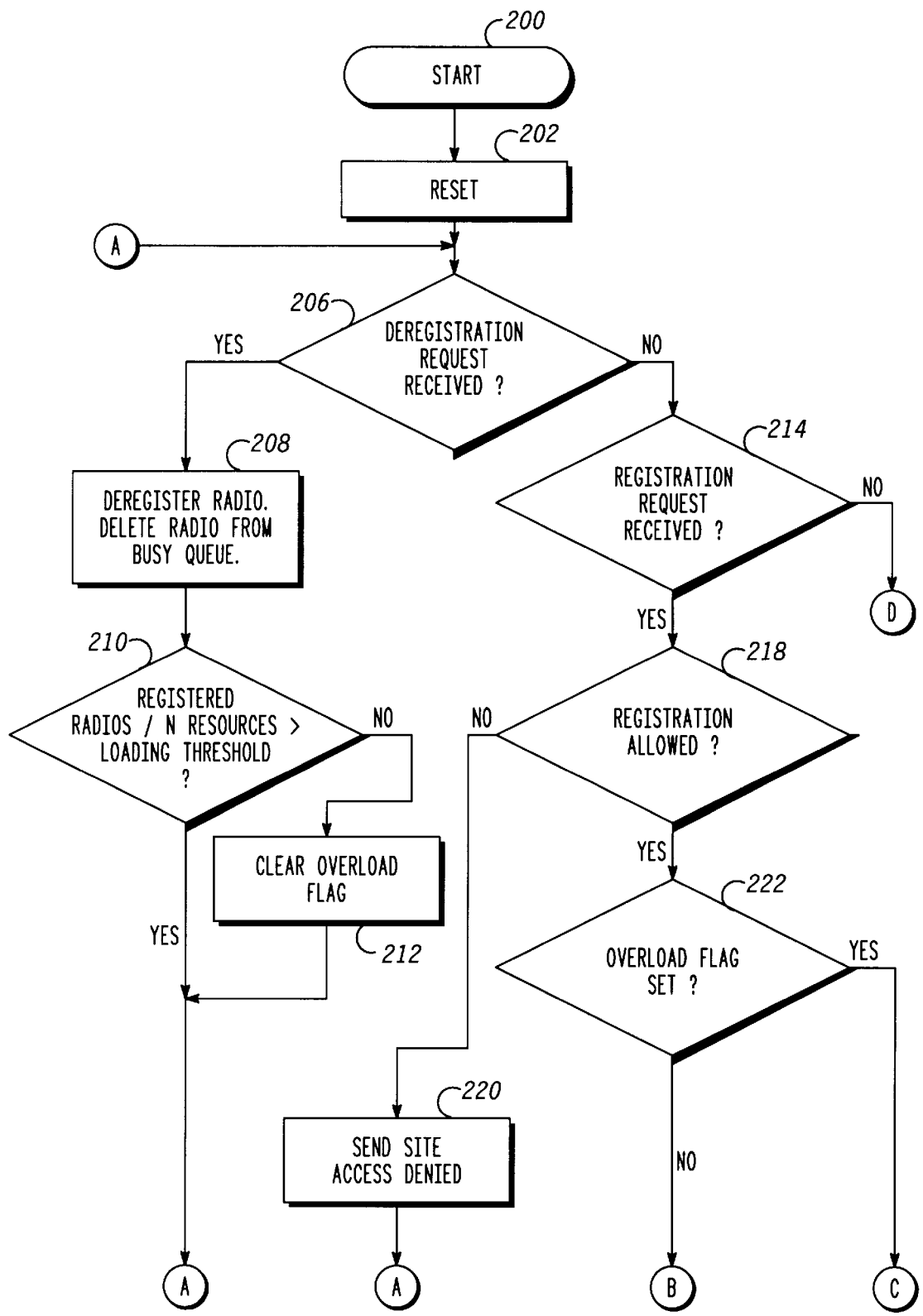
FIGS. 2 to 7 illustrate in a flowchart a preferred site controlling method according to the present invention.
Figure 3:
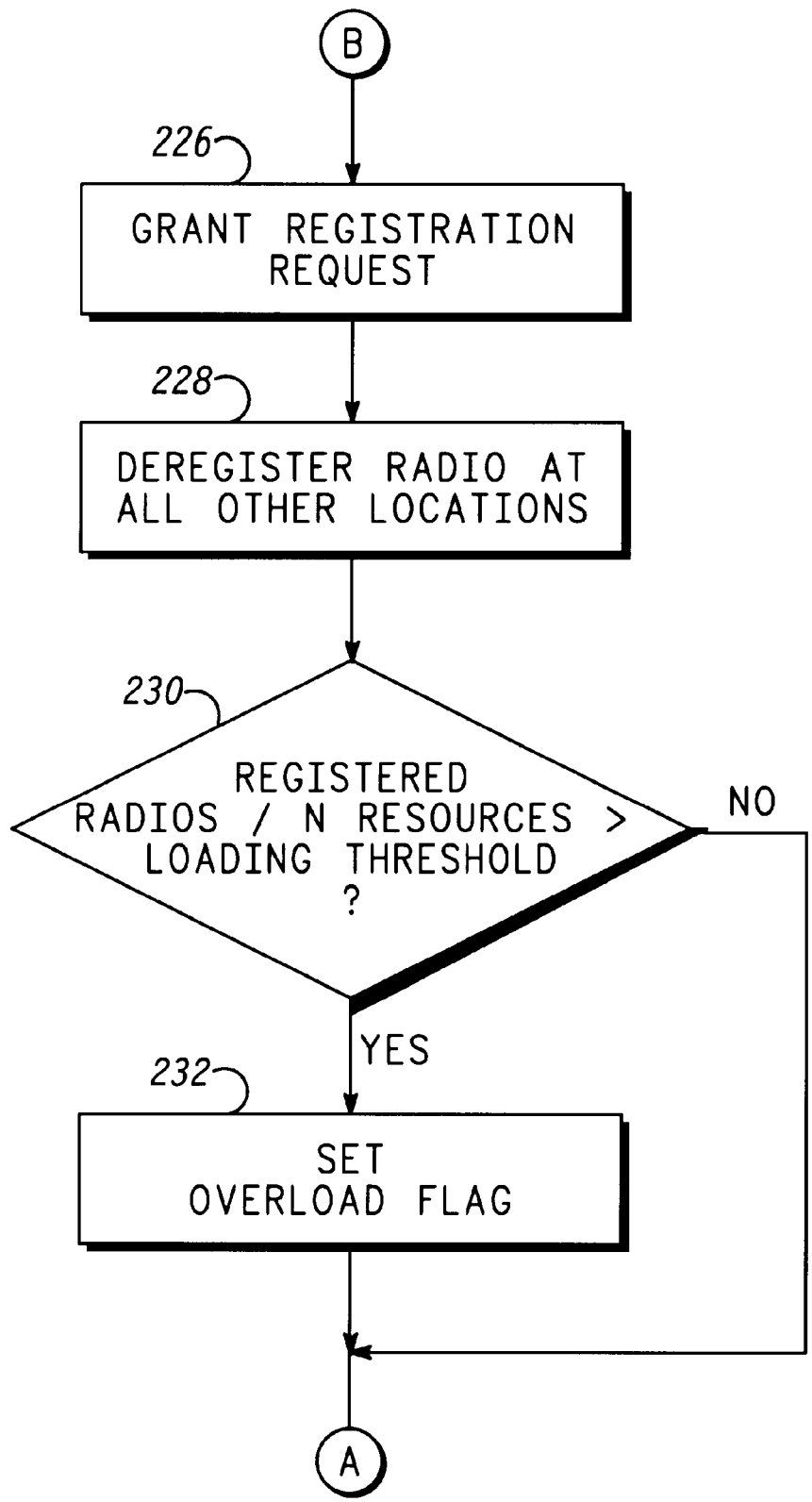
Figure 4:
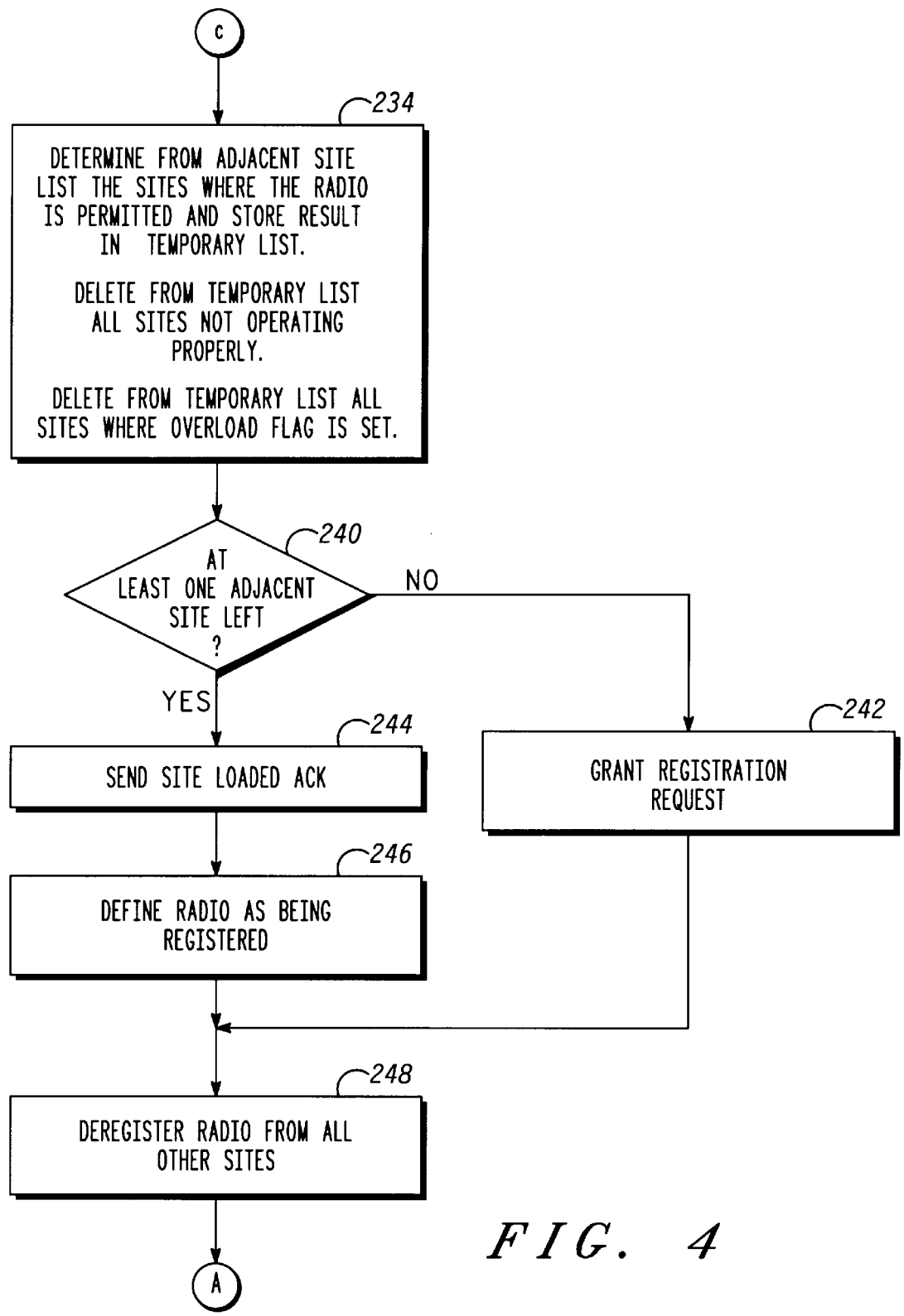
Figure 5:
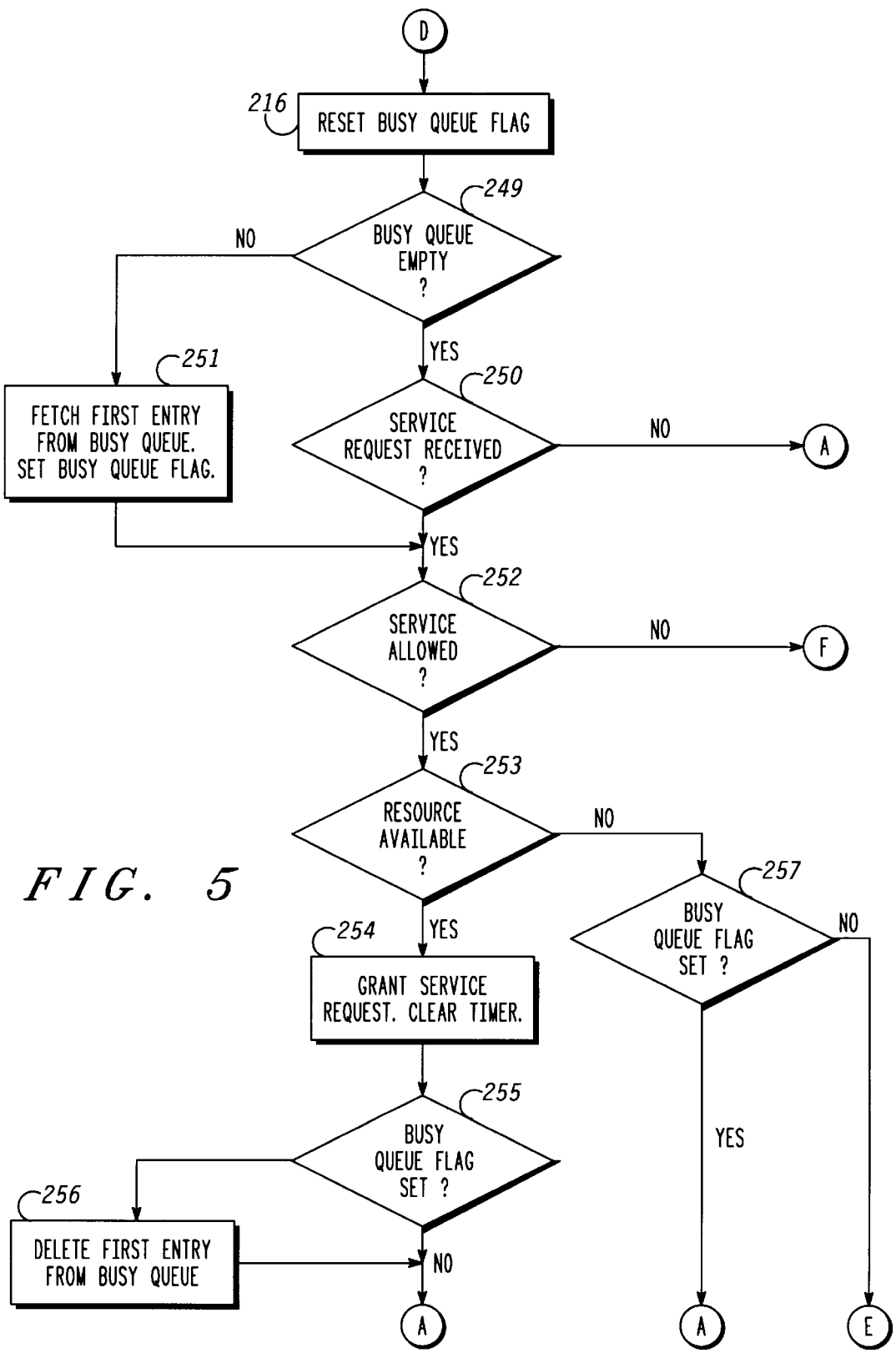

FIG. 1 shows a typical trunked multisite arrangement. A multisite controller 10 is connected in a non-limiting example to fixed transceivers 12–18 via connections 20–26 known by one skilled in the art. Each fixed transceiver 12–18 covers one of sites 28–34 for simplicity reasons drawn as circles. The multisite controller 10 consists of a processor (e.g. a microprocessor) 40 which is connected via I/O controller 44 to a coupler 41 that couples the connections 20–26 to the multisite controller 10. The coupler 41 performs the function, inter alia, of receiving means for receiving various requests from different sites. The processor 40 is connected to a memory 42 that stores system data like site parameters, actual loading conditions, busy queues, etc.

A mobile radio station 36 travels along its way 38 from point A to G. It can easily be seen that at points A and G the radio can receive only signals from one fixed transceiver, at points B, D and F it can receive signals from two fixed transceivers and at points C and E it can receive signals from three fixed transceivers.

In a non-limiting example the case will be considered where site 30 is not available for traffic communication (e.g.

it is a data-only site or it is a site to which the mobile radio station is not permitted access). With a prior art registration method the mobile radio station 36 registers in site 28 in point A and receives a registration grant acknowledgment from the system. At the site boundary between points C and D the mobile radio station 36 has to register to a new site and might either choose site 30 or 32 for this new registration. If mobile radio station 36 registers in site 30 and later requests a voice communication service this service has to be denied. If mobile radio station 36 registers in site 32 and later on requests a voice communication service this service is provided immediately or the request has to be stored in a busy queue in the memory 42 and treated later. The service request is stored in the busy queue if site 32 is at maximum traffic loading.

As soon as the limiting boundary of the site in which the mobile radio station is registered has been reached it re-registers itself. Finally the mobile radio station registers with site 34. In case that site 34 has voice communication resources immediately available it would be advantageous to register mobile radio station 36 in site 34 as soon as possible. This is not possible with prior art multisite controllers. A preferred registration and service request method according to the present invention will be described in accordance with FIGS. 2 to 7.

In a step 200 the multisite controller 10 is switched on and in step 202 it is reset to default values. These default values also include a loading threshold that can be set according to various parameters independently for each site. The loading of a site can be defined as the number of radios registered at a site divided by the total resources of that site (e.g. weighted sum of voice channels, data channels, local interconnect channels, etc.). The resources of a site need only to be recalculated when a resource is malfunctioning, disabled, or just has been repaired, so calculating the current loading is a matter of dividing the number or registered users by a fixed number. An overloading occurs when the current loading is above the loading threshold. This overloading is indicated by an overload flag to be described below. For simplicity reasons only the control method for one site will be explained. In reality the multisite controller 10 controls each site in parallel.

In step 206 the multisite controller 10 starts an endless loop for each site by determining if it has received a de-registration request. This de-registration request can either be issued by a mobile station just before switching it off or it is created automatically in the multisite controller 10 by another site registration grant to be described below. If the multisite controller 10 has received a de-registration request for the actual site then it de-registers in a step 208 the mobile radio station 36, deletes it from a busy queue (if it has been stored therein) and recalculates in a step 210 the loading of the site. If the loading is lower than the loading threshold then the multisite controller 10 clears the overload flag in step 212 regardless of whether it has been set or not. Both possibilities then lead back to the loop entry point 206.

If in step 206 the multisite controller 10 has not received a de-registration request then in step 214 it is checked as to whether it has received a registration request from a mobile radio station. If the multisite controller 10 has received in step 214 a registration request then in step 218 a check is made as to whether the registration is allowed at the present site. If the registration is not allowed then in step 220 a "site access denied" answer is sent to the requesting mobile radio station and the loop begins again at step 206.

If in step 218 it has been proved that a mobile radio station is allowed to operate at that side, then in step 222 the loading status for that site is checked. If the overload flag has not been set then in step 226 the registration request is granted and in step 228 the mobile radio station is automatically de-registered from all other sites. Then in step 230 the new site loading is calculated. If it is more than the loading threshold then the overload flag is set in step 232. The negative result of step 230 as well as step 232 then lead back to the loop entry point 206.

If in step 222 it has been decided that the overload flag has been set then the multisite controller 10 determines in step 234, from a pre-programmed list of adjacent sites in memory 42, all the sites where the radio is permitted access and stores the result in a temporary list in memory 42. Next the multisite controller 10 deletes from this temporary list all sites that do not operate properly and afterwards it deletes from the temporary list all sites where the overload flag has been set. In this manner the temporary list is minimized and in step 240 the multisite controller 10 checks if at least one adjacent site is left in the temporary list. If no such site exists then the multisite controller 10 sends "grant registration request" in step 242.

If in step 240 it has been decided that at least one adjacent site is left in the temporary list then the multisite controller 10 sends in step 244 a "site loaded acknowledgment" back to the mobile radio station and defines the radio in step 246 as being registered. The difference between "grant registration request" and defining a radio as being registered lies in the fact that for the grant of a registration first a radio has to be defined as being registered and then a "grant registration request" signal is sent as an acknowledgment over the system. After step 246 no explicit grant acknowledgment is necessary because the mobile radio has already received it implicitly with the site loaded acknowledgment message of step 244. Both steps 242 and 246 lead to a step 248 in which the multisite controller 10 automatically de-registers the radio at all other sites as a safety measure. Then the loop begins again at step 206.

If in step 214 it has been decided that no registration request has been received a busy queue flag is reset in step 216. Then in step 249 a check is made as to whether the multisite controller 10 has an empty busy queue for that site. If the busy queue for that site is not empty then the first entry of the busy queue is fetched in step 251 and the process continues with step 252 to be described below.

If in step 249 it has been decided that the busy queue for that site is empty then in step 250 a check is made as to whether the multisite controller 10 has received a service request. If no service request has been received then the loop starts again with step 206.

If in step 250 a service request has been received then in step 252 a check is made as to whether the requested service is allowed at that site. If the service has been allowed in step 252 then in step 253 it is determined if a resource is immediately available. If a resource is available then in step 254 the service is granted, a timer for that radio is cleared (for reasons that become clear from the description below) and in step 255 a check is made as to whether the busy queue flag has been set for that site. It is to be understood that the expression "timer" is intended to include an arrangement of time stamps, where a time stamp can be placed in memory with the radio's ID. This is described below.

If in step 255 it has been decided that the busy queue flag has been set then in step 256 the first entry of the busy queue is deleted. Step 256 and a negative result in step 255 lead back to the loop entry step 206. If step 253 determines that no resource is available at the moment then step 257 determines whether the busy queue flag has been set. If in step 257 is has been determined that the busy queue flag has been set then the loop returns to its entry step 206.

Figure 6:
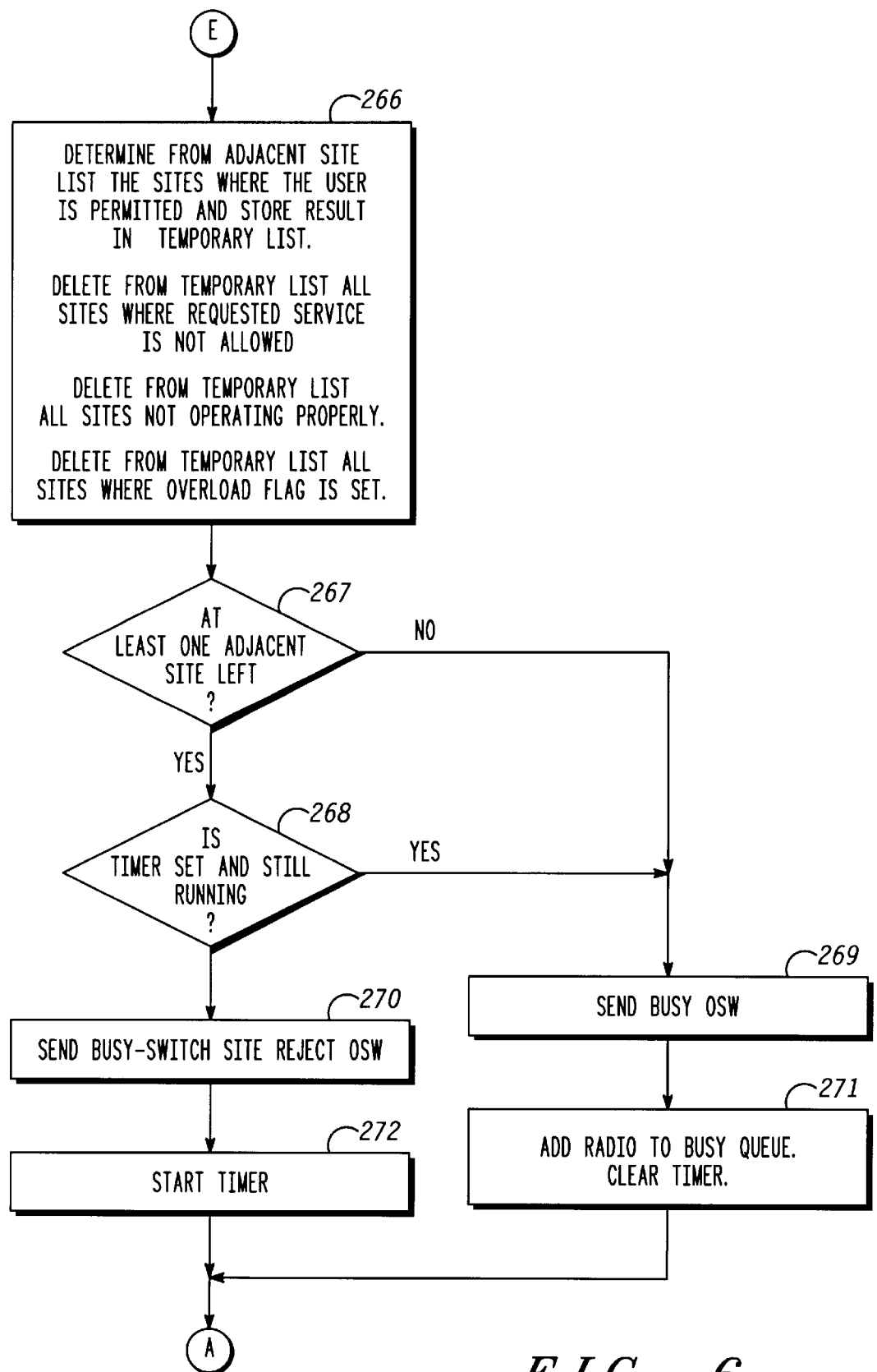
Figure 7:
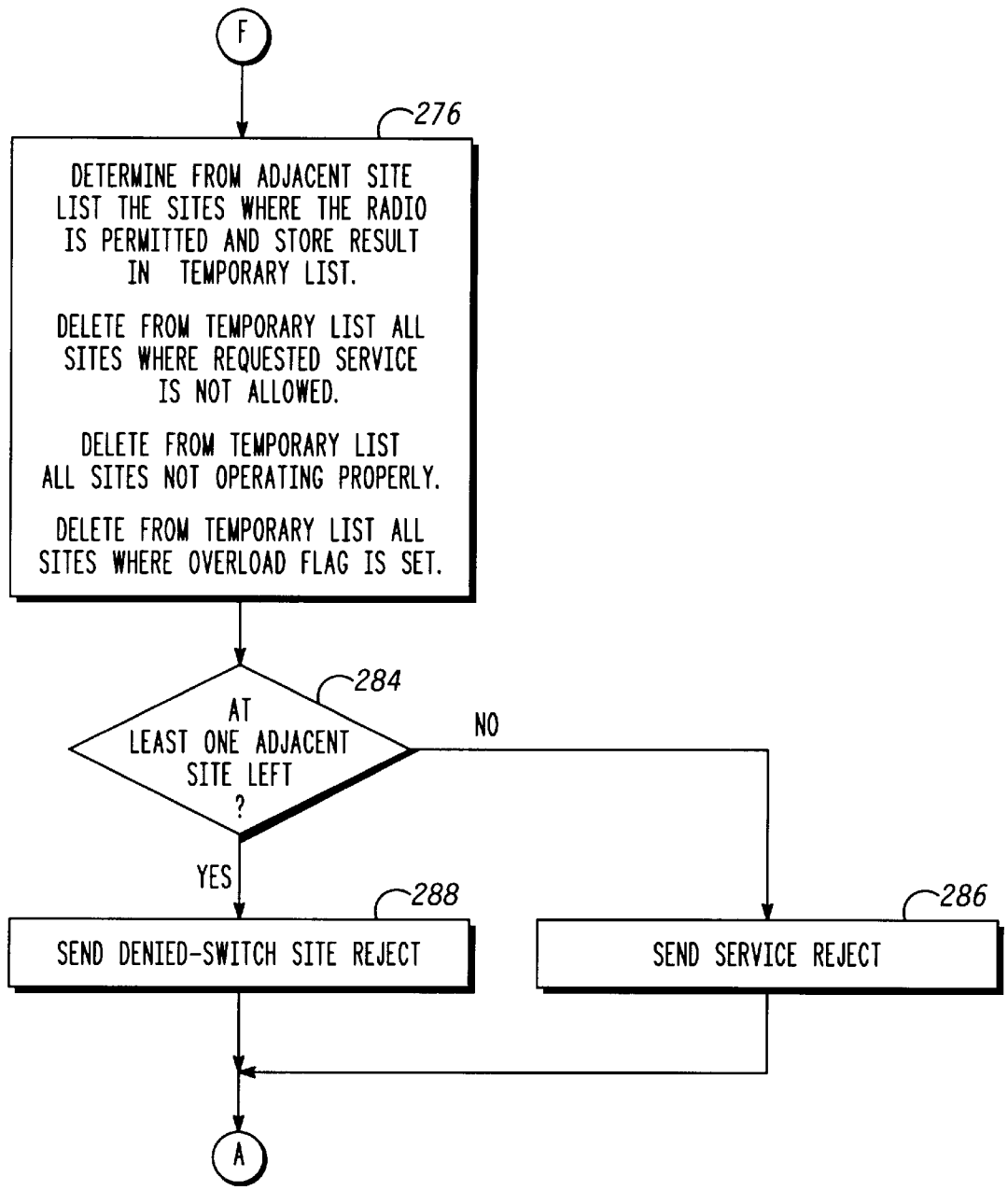

By restarting at step 206, and assuming no new de-registration or registration requests are received, the program promptly returns to step 251 and the first request in the busy queue is fetched and serviced (in step 254 as and when resources become available), until eventually (after sufficient number of cycles around the loop) the busy flag is cleared and step 257 proceeds to step 266 (FIG. 6).

If in step 257 it has been determined that the busy queue flag has not been set then in step 266 the sites where the radio is permitted are determined from the adjacent site list and the result is stored in a temporary list. From this temporary list all sites where the requested service is not allowed are deleted. Sites that are not working properly are deleted from the temporary list and also all sites where the overload flag has been set are deleted.

In step 267 it is determined whether at least one adjacent site has been left over. If in step 267 at least one adjacent site is contained in the temporary list then the multisite controller 10 checks in step 268 if a timer has been set for the requesting radio (distinguishable by its individual ID) and is still running. If the result is negative then the multisite controller issues in step 270 a "busy-switch site reject" OSW, in step 272 a timer is started for the requesting radio and the loop restarts with step 206. If in step 267 no adjacent site has been found left over or the result of step 268 has been positive (i.e. the timer started in step 272 has not yet timed-out) then the multisite controller 10 issues a "busy" OSW in step 269. In step 271 the radio is automatically added to the busy queue and the timer is cleared. Then the loop begins again with step 206.

The timer serves to indicate in the multisite controller that a "busy-switch site reject" OSW has recently been sent to the mobile radio station (step 270). If the multisite controller 10 receives a second service request from the mobile radio station while the timer is still running then the mobile radio station will receive, assuming that still no resources are available at that site, a "busy" OSW and will be added to the busy queue. Between these two service requests the mobile radio station tries to register and to request service at another site thus relieving the traffic load at the original site in case the service can be granted there.

If in step 252 (FIG. 5) it has been decided that the requested service is not allowed then step 276 (FIG. 7) determines from the adjacent site list the sites where the radio is permitted access and the result is stored in a temporary list. All sites where the requested service is not allowed are deleted from the temporary list and sites that do not operate properly are also deleted. Finally all sites are eliminated from the temporary list where the overload flag is set. Step 284 determines whether at least one adjacent site is still included in the temporary list. If in step 284 it has been determined that no adjacent site is left in the temporary list then the multisite controller 10 issues in step 286 a "service reject" response and the loop starts again at step 206. If in step 284 it has been determined that at least one adjacent site is left in the list then the multisite controller 10 issues in step 288 a "denied-switch site reject" response and the loop starts again at step 206.

Figure 8:
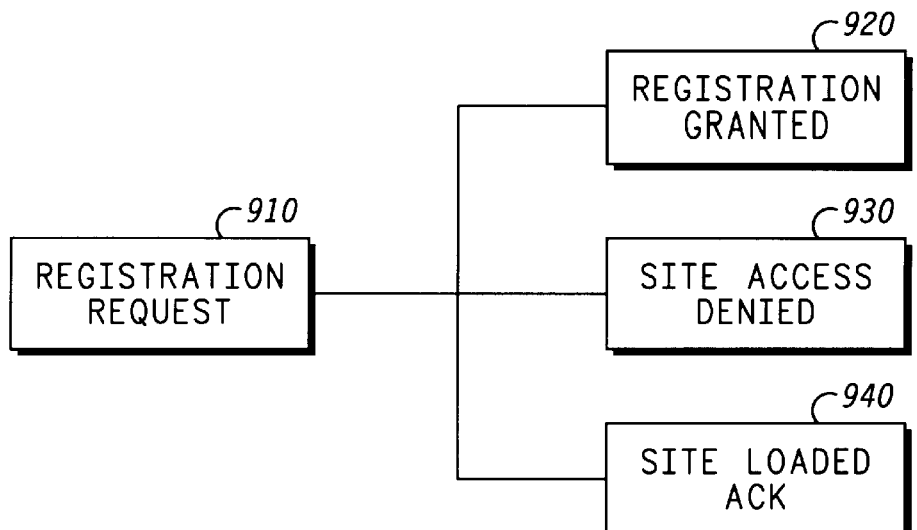
FIG. 8 shows the answers to a registration request command according to a preferred embodiment of the invention.

Steps 276 to 288 provide an optional but advantageous feature in which a mobile radio station which seeks service at a site (e.g. site 30) where service is not permitted (step 252) causes the system (multisite controller 10) to seek an adjacent site (e.g. site 32) where service is permitted for that mobile radio station. If such a site exists a "denied-switch site reject" OSW is sent (step 288). The mobile radio station interprets this not as an outright rejection, but as an indication to search for the adjacent site. The novel registration method is now described together with FIG. 8 from the mobile radio station's point of view.

Methods for scanning the received radio channels, storing them in a mobile radio station's memory according to a certain sorting criteria (e.g. the received field strength) and locking the mobile radio station onto a selected radio channel (e.g. the strongest received radio channel) are known by a person skilled in the art and need not be described further.

In a step 910 the mobile radio station issues a registration request to a site and the multisite controller responds with one of the answers 920 to 940. The first two possible answers, a "registration grant" answer 920 and a "site access denied" answer 930 are already known in the art.

The third possibility, a "site loaded acknowledgment" 940, indicates to the radio that the site where the mobile radio station has tried to register grants a second class registration because it is at its overload threshold or above and that the multisite controller knows of at least one adjacent site which is under the overload threshold and where the mobile radio station is permitted access.

The mobile radio station then tries to register at adjacent sites according to its memorized list in order to obtain a "registration grant" answer 920. Only if it has tried to register at at least one adjacent site (assuming there is at least one adjacent site) and has not obtained a registration grant answer 920 and no more sites are stored in the mobile radio station's memory then the mobile radio station remains registered with the first site. The mobile radio station now treats the second class acknowledgment "site loaded acknowledgment" 940 as an ordinary "registration grant". In this way the multisite controller can distribute the registered mobile radio station to the different sites.

If no first class acknowledgment is received from another site and only a second class acknowledgment is received, the mobile radio re-registers with the first site, receives the second class acknowledgment "site loaded acknowledgment" 940 (assuming there has been no change in circumstances in the meantime), and this time treats the second class acknowledgment "site loaded acknowledgment" 940 as an ordinary "registration grant" without further scanning.

Figure 9:
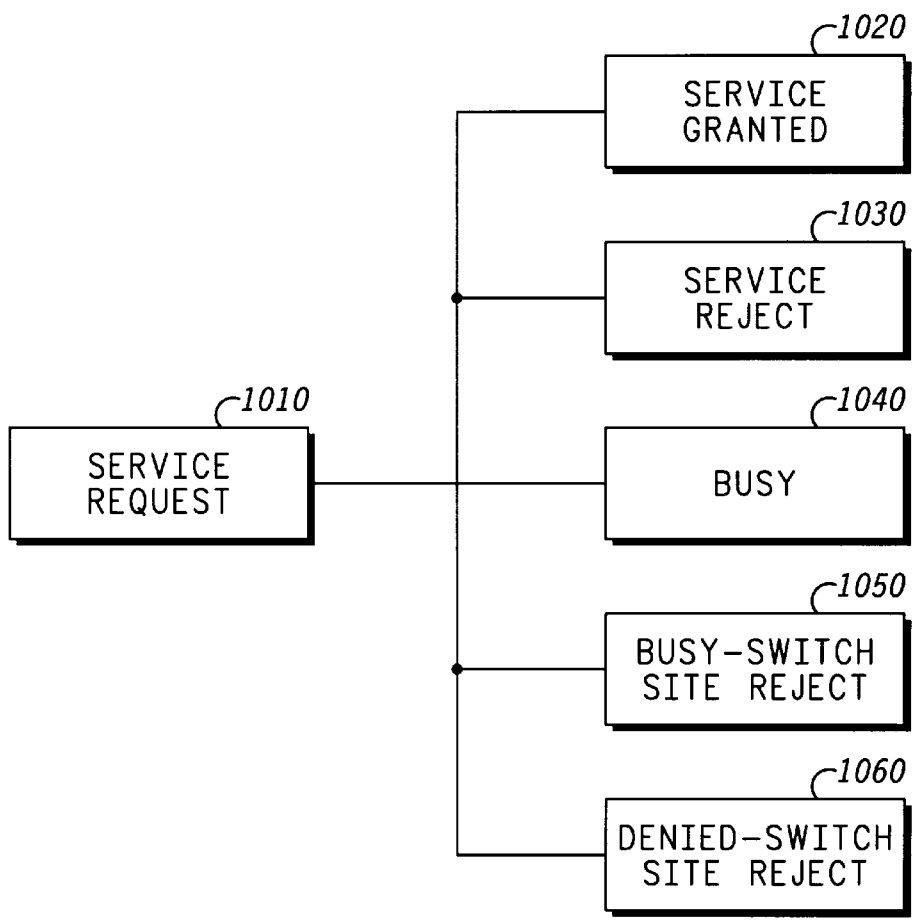
FIG. 9 shows the answers to a service request command according to a preferred embodiment of the invention.

The novel service request method is now described together with reference to FIG. 9 from the mobile radio station's point of view. A mobile radio station issues a service request 1010 to a site and the multisite controller responds with one of the answers 1020 to 1060. The first three possible answers, a "service grant" answer 1020, a "service reject" answer 1030 and a "busy" answer 1040 are already known in the art. The fourth possibility, a "busy-switch site reject" answer 1050, indicates to the radio that the site where the mobile radio station has tried to be serviced is overloaded and that there exists at least one adjacent site which could provide the requested service.

The mobile radio station then tries to register at adjacent sites according to its memorized list in order to obtain a "registration grant" answer 920 and later a "service grant" message 1020. If the mobile radio station has no success at other sites then it returns to the first site, registers and requests service again. Provided that this occurs within the time-out of step 268 (FIG. 6), the multisite controller sends a "busy" OSW and adds the mobile radio station to the busy queue of that site. In this way the multisite controller can distribute the traffic to the different sites according to their offered services.

With the fifth answer "denied-switch site reject" 1060 the multisite controller informs the mobile radio station that at the registered site the requested service is not allowed but that there exists at least one adjacent site which could provide this service. The mobile radio station therefore tries to register at adjacent sites and requests the service again. If it finds no other site, the mobile radio station keeps registered at the last successful registered site. Because the requested service as such is not available at that site no new service request will be made.

The radio can remain registered at the last successful registered site or can re-register at the original site. These are mere design options. In this way the multisite controller can increase the service availability at the different locations. The proposed method allows the multisite controller to define and control the relative load of any site dynamically, to be able to respond to resource failures, to operation and maintenance requests, to reallocate sites for specific purposes (e.g. in case of emergency), and to guarantee better resource utilization and thus an improved service to the radios.

Implementation of the proposed method requires minor software changes for subscriber radios and more processing capability for the multisite controller for each registration or service request. If the multisite controller processing time is a limitation factor then a partial solution is also possible: e.g. handling only the de-registration and registration requests while ignoring service requests which are disabled at the current site, etc.

Additional data (loading status, loading threshold) is minimal, and all the necessary data is located at the multisite's controller memory 42, so no new communication requirements or diagnostics are required. The overall processing needed at the multisite controller 10 is relatively small, compared to normal call (and busy) processing. No significant processing delay is expected.

Although the present invention has been described in combination with a trunked radio system with four sites it can be implemented without difficulties in a cellular system because the control operation is based on the amount of registered radios per site and not on the actual traffic load. Modifications of detail can be made by one skilled in the art without departing from the overall inventive concept described. For example, the memory 42 of FIG. 1 is merely illustrative and by no means limiting and the kind of memory is independent from the proposed method. Also, the flow diagrams of FIGS. 2 to 7 can readily be implemented in different orders of steps and can be expanded of simplified. Also, the busy queue handling is only shown in an illustrating way. For example it is possible for one skilled in the art to introduce different busy queues for each type of service, to introduce different priority levels for each requested service or to make distinctions according to the length of a busy queue.

To implement a timer, a time stamp can be put in a mobile radio's ID record in the memory 42 when a registration (or service) request is denied. In the next request, the time difference between the old time stamp and the current time can be used to decide whether to grant a request or deny it again.

What is claimed is:

1. A method of controlling a radio system, comprising:
   at the mobile station, attempting to register with a first site;

at the first site, monitoring a site loading parameter and, if the site loading parameter does not exceed a threshold, sending a first class of acknowledgment to the radio and if the site loading parameter exceeds the threshold, sending a second class of acknowledgment to the radio;

at the mobile radio station, in response to a first class of acknowledgment, treating the first site as the registered site for further communications and, in response to a second class of acknowledgment, attempting to register at a second site and if no acknowledgment is received from the second site, treating the first site as the registered site even if the site loading parameter exceeds the threshold.

2. A method according to claim 1, comprising further the step of continuing to treat the first site as the registered site until a first class of acknowledgement is received from another site.

3. A method according to claim 1, wherein the step of attempting to register at a second site comprises the step of attempting to register at each of a finite list of adjacent sites and, if no first class acknowledgement is received from one of those sites, continuing to treat the first site as the registered site.

4. A method according to claim 1, comprising the step of, prior to sending a second class of acknowledgment, checking that an adjacent site exists, on which the radio is permitted to operate and at which the site loading parameter does not exceed a threshold.

5. A method according to claim 1 comprising the steps of, following receipt of an acknowledgement at the mobile radio station from a particular site acknowledging the registration in response to an attempt to register, sending to the particular site a request for service.

6. A method according to claim 5 comprising the steps of, in response to a request for service, if a traffic resource is immediately available at the particular site, sending an unconditional traffic resource grant message;

if a traffic resource is not immediately available at the particular site, checking that an adjacent site exists, on which the radio is permitted to operate and at which the site loading parameter does not exceed a threshold, and if no such site exists, adding the identification of the radio requesting service to a queue of identifications for granting of service, and if such a site exists, sending a message denying the traffic resource.

7. A method according to claim 6, comprising the steps of, at a mobile radio station, receiving a message denying a traffic resource, and requesting service from an adjacent site.

8. A method according to claim 7, comprising the further steps of requesting service from each of a finite list of adjacent sites and, if no message is received from one of those sites confirming grant of service, again requesting service from the first-mentioned site.

9. A method according to claim 8, comprising the step of, in the radio system, monitoring a time-out period between a first request for service from a given mobile radio station which results in denying of service and a second request for service from the same radio and, if the second request is received within a time-out period, adding the identification of the radio requesting service to the queue for service.

10. A radio system comprising a plurality of fixed transceivers serving a plurality of radio coverage sites and a multisite controller connected to the fixed transceivers, the multisite controller comprising:

a memory including mobile radio station identifications and site associations, associating mobile radio station identifications with sites at which the corresponding mobile radio stations are registered;

processing means for computing a site loading parameter for each site, dependent on the resources at the site and the number of mobile radio stations associated with the site;

receiving means for receiving from a given site a request from a mobile radio station to form a new association between the given site and the identification of the mobile radio station sending the request; and selection means, responsive to the processing means, for selecting a response to the request indicating one of a plurality of different classes of registration dependent on the site loading parameter in the given site and the site loading parameter in at least one adjacent site, wherein a first class of the plurality of different classes of registration is indicative of an immediate registration grant at the given site, and a second class of the plurality of different registration classes is indicative of a registration grant at the given site only if registration is unsuccessful at the at least one adjacent site.

* * * * *